(12) United States Patent
Parks et al.

(10) Patent No.: US 9,115,834 B2
(45) Date of Patent: Aug. 25, 2015

(54) QUICK CONNECTOR

(75) Inventors: Brian A. Parks, Fenton, MI (US);
Matthew D. Lutzke, Clarkston, MI (US)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 14/017,875

(22) PCT Filed: Mar. 16, 2012

(86) PCT No.: PCT/US2012/029405
§ 371 (c)(1),
(2), (4) Date: Sep. 6, 2013

(87) PCT Pub. No.: WO2012/154298
PCT Pub. Date: Nov. 15, 2012

(65) Prior Publication Data
US 2014/0001752 A1   Jan. 2, 2014

Related U.S. Application Data

(60) Provisional application No. 61/454,058, filed on Mar. 18, 2011.

(51) Int. Cl.
*F16L 37/00* (2006.01)
*F16L 37/133* (2006.01)
*F16L 37/14* (2006.01)

(52) U.S. Cl.
CPC ............ *F16L 37/133* (2013.01); *F16L 37/144* (2013.01); *F16L 2201/10* (2013.01)

(58) Field of Classification Search
USPC .......................... 285/305, 308, 309, 310, 319
See application file for complete search history.

(56) References Cited

U.S. PATENT DOCUMENTS

| 3,753,582 | A  | * | 8/1973 | Graham .................. 285/305 |
| 4,311,328 | A  |   | 1/1982 | Truchet |
| 4,471,978 | A  |   | 9/1984 | Kramer |
| 4,721,331 | A  | * | 1/1988 | Lemelshtrich .............. 285/305 |
| 6,702,335 | B2 | * | 3/2004 | Bahner et al. .............. 285/305 |
| 7,530,605 | B2 | * | 5/2009 | Rigollet et al. ............ 285/305 |
| 2002/0071718 | A1 |   | 6/2002 | Marty et al. |
| 2002/0117853 | A1 |   | 8/2002 | Bartholomew |
| 2007/0126232 | A1 |   | 6/2007 | Campagna et al. |

(Continued)

FOREIGN PATENT DOCUMENTS

EP   1635106 A2   3/2006
FR   2919373 A1   1/2009

(Continued)

*Primary Examiner* — Aaron Dunwoody
(74) *Attorney, Agent, or Firm* — Dickinson Wright PLLC

(57) ABSTRACT

A quick connector assembly for quickly connecting and establishing fluid communication between a male end form having a bead and a tube. The quick connector assembly includes a housing having a stem portion for receiving the hose and a female receiving portion for receiving the male end form. The quick connector includes a locker which is moveable between a non-engaged position for allowing the male end form to be inserted into or withdrawn from the quick connector assembly and an engaged position for trapping the male end form in the quick connector assembly. The locker includes a pair of outside legs, each having a notch, and the housing includes a pair of windows for receiving the notches when the locker is in the engaged position. The locker cannot be moved back to the non-engaged position until the outside legs are pulled outwardly, thereby disengaging the notches from the windows.

14 Claims, 3 Drawing Sheets

(56) References Cited

U.S. PATENT DOCUMENTS

2007/0194173 A1 8/2007 Paasche
2009/0261582 A1 10/2009 Gaudin

FOREIGN PATENT DOCUMENTS

FR 2945605 A3 11/2010
WO 0177562 A2 10/2001

* cited by examiner

QUICK CONNECTOR

CROSS-REFERENCE TO RELATED APPLICATIONS

This U.S. National Stage Patent Application claims the benefit of International Application serial number PCT/US2012/029405 filed Mar. 16, 2012, entitled "Quick Connector" which claims priority to U.S. Provisional Patent Application Ser. No. 61/454,058 filed Mar. 18, 2011, entitled "Quick Connector," the entire disclosures of the applications being considered part of the disclosure of this application, and hereby incorporated by reference.

BACKGROUND OF THE INVENTION

1. Field of the Invention

The present invention relates to quick connector assemblies, and more specifically, to quick connector assemblies which receive and lock with a male end form.

2. Description of the Prior Art

Quick connector assemblies are used in many different applications for quickly connecting and establishing fluid communication between a male end form and a hose or another tube. It is important that the male end form can quickly engage with the quick connector assembly to minimize assembly time and labor, e.g. on an assembly line. At the same time, the quick connector assembly must be very reliable and must establish a fluid-tight seal with the male end form which will not leak or otherwise disengage from the male end form. In the automotive industry, quick connector assemblies are often used for fuel lines, and failure of the quick connector assembly could pose a serious safety risk. To mitigate this risk, manufacturers have developed assemblies that cannot be latched down until the male end form is completely inserted into the quick connector.

One known type of quick connector assembly includes a housing having a female receiving portion for receiving a male end form and a stem portion for receiving a hose. A locker is movable between a non-engaged position for allowing insertion or withdrawal of the male end form and an engaged position for engaging the bead to retain the male end form in the housing. The locker includes a ring that prevents the locker from moving to the engaged position until the male end form is inserted into the housing by a predetermined distance, whereupon the ring breaks to allow the male end form to be fully inserted into the housing. Once the male end form is fully inserted into the housing and the bead passes the locker, the locker may be moved downwardly into the engaged position to engage the bead and hold the male end form in a locked position within the housing. The locker may then be moved back to the non-engaged position for allowing withdrawal of the male end form. However, once the male end form is removed from the quick connector assembly, because the ring has been broken, there is nothing to prevent the locker from moving back into the engaged position, even when the male end form is not disposed in the housing. Thus, this type of quick connector assembly only prevents the locker from moving to the engaged position until the quick connector assembly first receives a male end form. Thereafter, there is no safety mechanism for preventing the locker from moving to the engaged position, even when the male end form is not inserted into the housing of the quick connector assembly. A user could accidentally move the locker to the engaged position without the male end form being properly locked within the housing.

There remains a significant and continuing need for an improved quick connector assembly which is both reliable and reusable.

SUMMARY OF THE INVENTION

At least one aspect of the present invention provides for a quick connector assembly for mating with a male end form including a housing having an exterior surface and an inner bore for receiving the male end form. A locker having a pair of outside legs slidably engages the exterior surface of the housing. The locker is moveable between a non-engaged position for allowing the male end form to be inserted into or withdrawn from the inner bore and an engaged position for trapping the male end form in the inner bore. Either the outside legs of the locker or the exterior surface includes at least one notch and the other includes at least one window for receiving the notch when the locker is in the engaged position. Thus, the locker can only be moved from the engaged position to the non-engaged position only after the outside legs of the locker are pulled away from the housing to disengage the notches from the windows. This is as a safety mechanism which prevents the locker from accidentally moving out of the engaged position. Additionally, when the locker is moved into the engaged position, thereby trapping the male end form, the springing of the notches into the windows may produce an audible sound which may indicate to a person, e.g. an assembly line worker or a mechanic, that the locker is in the proper engaged position.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
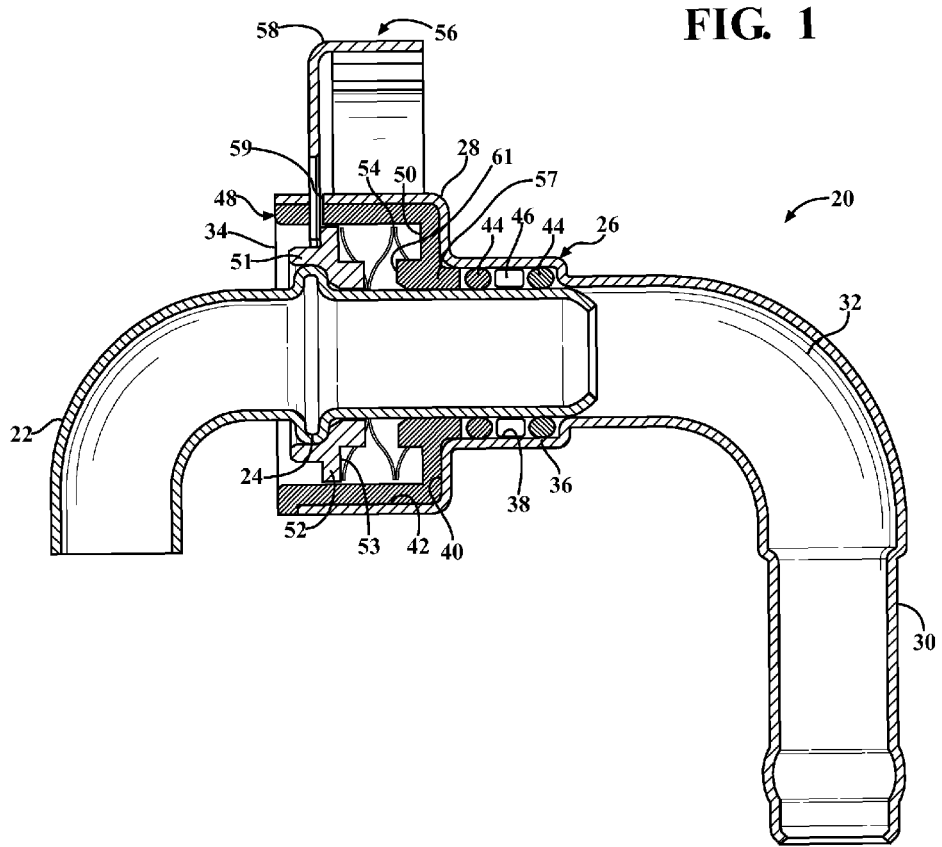
FIG. 1 is a cross-sectional view of the exemplary embodiment of the quick connector assembly with the locker in a non-engaged position.
Figure 2:
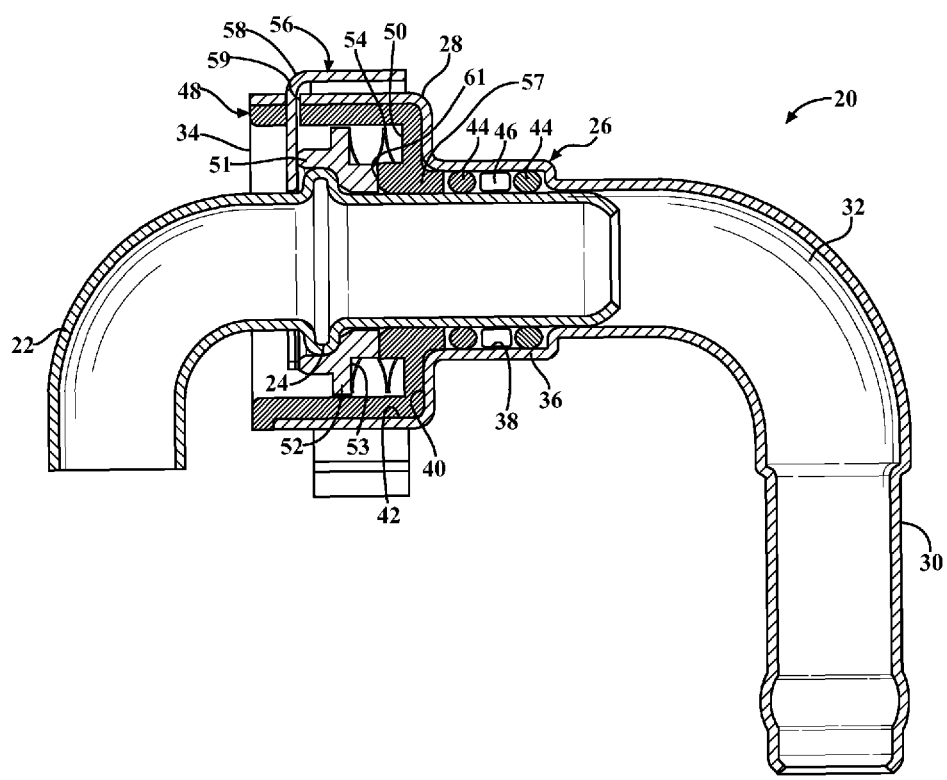
FIG. 2 is a cross-sectional view of the exemplary embodiment of the quick connector assembly with the locker in an engaged position.

Referring to the Figures, wherein like numerals indicate corresponding parts throughout the several views, an exemplary quick connector assembly 20 for establishing fluid communication between a male end form 22 and another hose or tube (not shown) is generally shown in FIGS. 1-4. The male end form 22 is preferably of metal, has a generally tubular shape with a bead 24 and extends forwardly of the bead 24 to a tube end. However, it should be appreciated that the male end form 22 could be of any desirable material and could have any desirable shape.

The exemplary quick connector assembly 20 includes a housing 26, generally indicated, presenting a female receiving portion 28 for receiving the aforementioned male end form 22 and a stem portion 30 for receiving and establishing fluid communication with a hose or any other type of tube (not shown). In the exemplary embodiment, the housing 26 is formed of metal and is shaped through a deep drawing process. However, it should be appreciated that the housing 26 could be of any desirable type of formable material including, for example, polymeric materials or composites. The housing 26 could also be shaped through any desirable process, such as machining, injection molding, stamping, etc.

The housing 26 has an inner bore 32 which extends in an axial direction between the female receiving portion 28 and the stem portion 30 for conveying a fluid from the male end form 22 to the tube or hose (not shown) mating with the stem portion 30. The female receiving portion 28 presents an inlet orifice 34 for receiving the male end form 22 into the inner bore 32. The inner bore 32 of the female receiving portion 28 is twice-counterbored to present a first shoulder 36 opening up to a first section 38 having a first diameter and a second shoulder 40 opening up to a larger second section 42 having a second diameter which is larger than the first diameter. The exemplary stem portion 30 extends through a right angle. However, it should be appreciated that the stem portion 30 could have a range of different shapes.

A pair of sealing rings 44 is disposed in the first section 38 of the inner bore 32 with one of the sealing rings 44 abutting the first shoulder 36, and a spacer 46 is sandwiched in the first section 38 of the bore 32 between the sealing rings 44. The sealing rings 44 are preferably O-rings which could be made of a variety of elastic materials depending on the fluid and operating temperatures of the quick connector assembly 20. The exemplary spacer 46 is of a thermoplastic material and is produced through an injection molding process; however, the spacer 46 could be of any desirable material and could be formed through any desirable process. It should also be appreciated that the first section 38 could include any number (including zero) of sealing rings 44.

The quick connector assembly 20 of the exemplary embodiment further includes a generally cylindrically shaped bushing 48 disposed in the second section 42 of the inner bore 32 and extending between the second shoulder 40 and the inlet orifice 34. The bushing 48 also extends radially inwardly along the second shoulder 40 of the housing 26 to present a first spring seat 50 (discussed in further detail below) and axially into the first section 38 to abut the first sealing ring 44 for retaining the first and second sealing rings 44 and the spacer 46 in the first section 38 of the inner bore 32. The exemplary bushing 48 is of a thermoplastic material and is produced through an injection molding process. However, it should be appreciated that the bushing 48 can be of any desirable material and could be produced using any desirable forming process.

The quick connector assembly 20 also includes a plunger 52 having a generally annular shape and slidably disposed within the bushing 48 in the second section 42 of the inner bore 32. The plunger 52 has a front section 51 with a large diameter for receiving the bead 24 of the male end form 22 and a rear section having a small diameter for receiving the portion of the male end form 22 in front of the bead 24. The plunger 52 also includes a radially extending portion 57 which is sized similarly to the opening of the bushing 48 for guiding movement of the plunger 52 within the bushing 48.

The plunger 52 also has a second spring seat 53 which faces the above-discussed first spring seat 50 of the bushing 48. A spring 54 is disposed in the second section 42 of the inner bore 32 and extending between the first spring seat 50 of the bushing 48 and the second spring seat 53 of the plunger 52 for biasing the plunger 52 toward the inlet orifice 34 and into a resting position, which is shown in FIG. 1 and discussed in further detail below. The spring 54 of the exemplary embodiment is a wave spring 54 formed of stainless steel stock material; however, it should be appreciated that any other type of compression spring 54 could alternately be used. The plunger 52 is preferably of a thermoplastic material and is produced through an injection molding process. However, the plunger 52 could be of any desirable material and may be produced using any desirable forming method.

Figure 3:
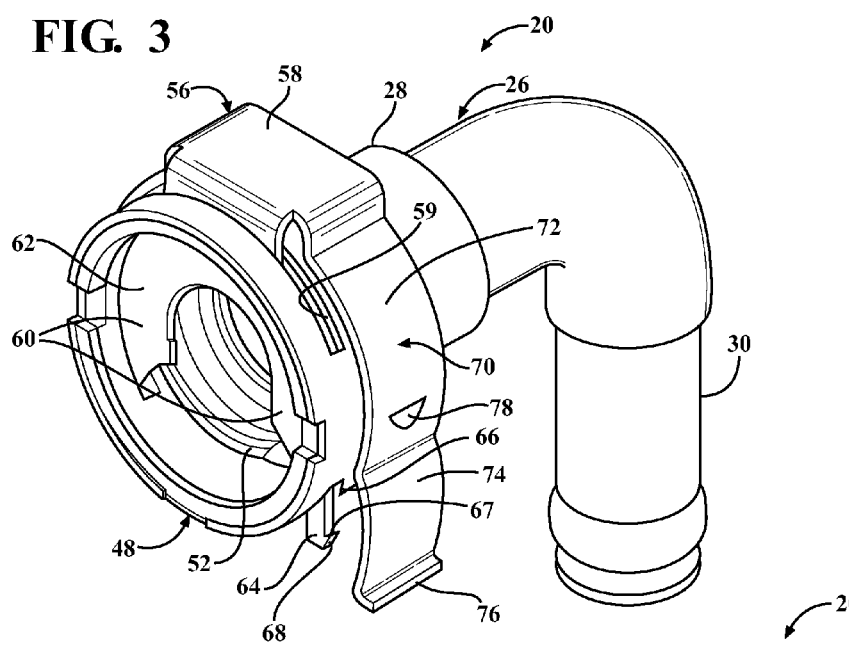
FIG. 3 is a perspective and elevation view of the exemplary embodiment of the quick connector assembly with the locker in the engaged position.

The quick connector assembly 20 also includes a locker 56 which is movable between an engaged position (FIGS. 2-4) for retaining the male end form 22 in the housing 26 and a non-engaged position (FIG. 1) for allowing the male end form 22 to be inserted into or removed from the housing 26. The locker 56 includes a base 58 and a pair of inside legs 60 extending downwardly into the inner bore 32 through at least one upper gap 59 in the female receiving portion 28 of the housing 26 and the bushing 48. As best shown in FIG. 3, each of the inside legs 60 has an upper section 62 and a different lower section 64. The upper sections 62 are spaced from one another by a distance that is slightly greater than the diameter of the male end form 22, and the lower sections 64 are spaced by a distance that is greater than the diameter of the bead 24 of the male end form 22 but less than the diameter of the plunger 52. Thus, when the locker 56 is in the non-engaged position shown in FIG. 1, the spring 54 biases the plunger 52 against the lower sections 64 of the inside legs 60, and this position is hereinafter referred to as a "resting position". Because of the larger spacing of the lower sections 64 of the inside legs 60, when the locker 56 is in the non-engaged position, the bead 24 of the male end form 22 may be inserted into the housing 26 past the inside legs 60 of the locker 56 to the position shown in FIGS. 2-4. After the bead 24 clears the inside legs 60, the locker 56 can be moved downwardly into the engaged position of FIGS. 2-4. With the locker 56 in the engaged position, the bead 24 of the male end form 22 is trapped between the upper sections 62 of the inside legs 60 and the radially extending portion 57 of the plunger 52. With that, the male end form 22 has successfully been locked and sealed with the quick connector assembly 20. Additionally, the plunger 52 is biased against the bead 24 of the male end form 22, and therefore, movement of the male end form 22 relative to the housing 26 is restricted, even if the quick connector assembly 20 is vibrated, such as when a vehicle is travelling down a bumpy road. The bushing 48 may also have a flange 61 extending toward the plunger 52 for contacting the plunger 52 when the male end form 22 is locked in the quick connector assembly 20, i.e. the flange 61 defines how far the plunger 52 can be pushed into the inner bore 24.

The bushing 48 further includes a pair of circumferentially spaced shelves 66, and each of the inside legs 60 of the locker 56 presents an outwardly extending lip 67 corresponding with one of the shelves 66 and a tapered section 68 leading to the lip 67. When the locker 56 is initially installed onto the housing 26, the tapered sections 68 of the inside legs 60 engage the bushing 48 to flex the inside legs 60 inwardly. Once the lips 67 clear the shelves 66, then the inside legs 60 flex back outwardly to their unstressed positions. If a user attempts to remove an already installed locker 56 from the housing 26, the lips 67 on the inside legs 60 will engage the shelves 66 of the bushing 48 to prevent the locker 56 from being removed from the housing 26. Preferably, the lip 67 and shelves 66 are strong enough to withstand a force of up to ninety (90) Newtons.

As shown in FIG. 3, when the locker 56 is in the engaged position, the lower sections 64 of the inside legs 60 extend downwardly through lower gaps in the bushing 48 and the housing 26 to provide evidence that the locker 56 is in the engaged position. This is advantageous because it provides a visual cue to a person, e.g. an assembly line worker or a mechanic, that the locker 56 has reached the engaged position and the male end form 22 is properly locked and sealed with the quick connector assembly 20.

The locker 56 also includes a pair of outside legs 70 extending downwardly from the base 58 for engaging the exterior surface of the female receiving portion 28 of the housing 26. The outside legs 70 are spaced from one another and each has a first arc-shaped section 72 having the same curvature as the exterior surface of the housing 26, a second arc-shaped section 74 also having the same curvature as the exterior surface of the housing 26 and a flared section 76 flaring outwardly from the second arc-shaped section 74. When the locker 56 is installed onto the female receiving portion 28 of the housing 26 during assembly of the quick connector assembly 20, the flared sections 76 of the outside legs 70 help guide the outside legs 70 onto the housing 26. The locker 56 is then pushed downwardly to flex the outside legs 70 outwardly until the second arc-shaped sections 74 engage the housing 26. At this point, the locker 56 is in the non-engaged position shown in FIG. 1. To move the locker 56 downwardly into the engaged position of FIGS. 2-4, a downward force must be applied to the base 58 to flex the outside legs 70 outwardly until the first arc-shaped sections 72 engage the housing 26. The shape of the outside legs 70 only allows the locker 56 to remain in either the non-engaged position or the engaged position, and thus, the locker 56 of the exemplary embodiment cannot be moved into a partially-engaged position from which the male end form 22 could accidentally detach from the quick connector assembly 20. This is yet another important safety feature of the quick connector assembly 20.

Figure 4:
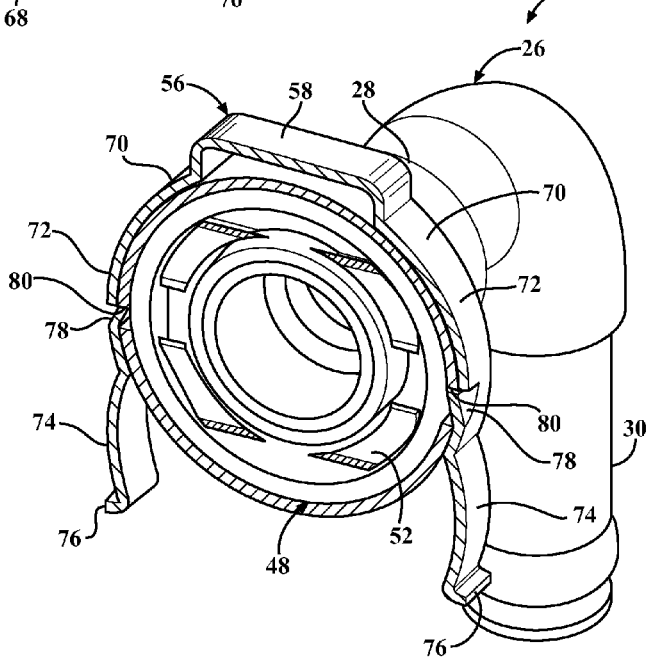
FIG. 4 is a perspective and sectional view of the exemplary embodiment of the quick connector assembly with the locker in the engaged position.

As shown in FIGS. 3 and 4, each of the outside legs 70 of the locker 56 also includes at least one notch 78 defining a tab which extends radially inwardly from its first arc-shaped section 72. In the exemplary embodiment, the notch 78 is formed by cutting a small slit in the locker 56 and bending the material of the locker 56 at the slit to present the tab. This is a quick process which adds very little cost or labor to the fabrication of the locker 56. As best shown in the sectional view of FIG. 4, the housing 26 presents a window 80 for receiving and engaging the tab 78 of the locker 56 when the locker 56 is in the engaged position with the first arc-shaped sections 72 of the outside legs 70 engaging the housing 26. The connection of the tabs 78 of the locker 56 with the windows 80 of the housing 26 prevents the locker 56 from being moved out of the engaged position with only an upward force being applied on the locker 56. Rather, outside legs 70 must be pulled apart to disengage the tab 78 from the window 80 before the locker 56 can be moved out of the engaged position. This safety mechanism provides further protection to ensure that the locker 56 does not accidentally move out of the engaged position. It should be appreciated that the tabs 78 could alternately be formed on the housing 28 and the windows 80 could be formed on the outside legs 70.

As best shown in FIG. 3, when the locker 56 of the exemplary embodiment is in the engaged position, the base 58 is raised relative to the top of the housing 26, and the inside legs 60 extend downwardly from either side of the base 58. This arrangement presents an opening between the base 58 and the housing 26 for receiving a regular screw-driver, or a similar tool, which can be inserted into this opening and used to pry the locker 56 upwardly to the non-engaged position. Alternatively, the flared sections 76 of the outside legs 70 of the locker 56 could be pulled outwardly and upwardly to move the locker 56 from the engaged position to the non-engaged position. Thus, only a deliberate action by the user can move the locker 56 into the non-engaged position. This is still another safety feature of the quick connector assembly 20.

As best shown in FIG. 4, when the locker 56 of the exemplary embodiment is in the engaged position, the base 58 is raised relative to the housing 26, and the inside legs 60 extend downwardly from one side of the base 58. This arrangement presents an opening on the opposite side of the base 58 from the inside legs 60. A regular screw-driver, or a similar tool, can be inserted into this opening and used to pry the locker 56 upwardly to the non-engaged position only after the outside legs 70 have been pulled apart to disengage the notches 78 of the outside legs 70 from the windows 80 of the housing 26. Alternatively, the flared sections 76 of the outside legs 70 of the locker 56 can be pulled apart to separate the tabs 78 from the windows 80 and pushed upwardly without the need for a tool to move the locker 56 from the engaged position to the non-engaged position.

In operation, the quick connector assembly 20 starts with the locker 56 in the non-engaged position and the plunger 52 in the resting position. As discussed above, in this position, the plunger 52 is biased forwardly by the wave spring 54 against the lower sections 64 of the inside legs 60 of the locker 56. This contact between the inside legs 60 and the plunger 52 prevents the locker 56 from moving downwardly to the engaged position and prevents the plunger 52 from escaping the housing 26. The male end form 22 is then urged in an axial direction into the bore 32 of the housing 26 through the receiving inlet 34, and the front of the male end form 22 is sealed to the housing 26 through the sealing rings 44 to prevent fluid from escaping the quick connector assembly 20. Once the male end form 22 has been inserted far enough into the bore 32, the bead 24 of the male end form 22 will engage the plunger 52. Further insertion of the male end form 22 will overcome the biasing force from the wave spring 54 to move the plunger 52 backwardly. Once the bead 24 clears the inside legs 60, the locker 56 can be urged downwardly into the engaged position to trap the bead 24 of the male end form 22 between the plunger 52 and the upper sections 62 of the inside legs 60 of the locker 56. It should be noted that it is only after the male end form 22 has been inserted sufficiently far into the bore 32 of the housing 26 for the bead 24 to clear the inside legs 60 that the locker 56 can be moved into the engaged position. This feature, when combined with the visible cue that the locker 56 has been successfully moved into the engaged position ensures that the male end form 22 can only be properly locked and sealed with the quick connector assembly 20.

To remove the male end form 22 from the quick connector assembly 20, a user must first disengage the tabs 78 of the locker 56 from the windows 80 of the housing 26, then he or she can either use a regular screwdriver to pry the base 58 of the locker 56 upwardly or push the outside legs 70 of the locker 56 outwardly. Once the locker 56 reaches the non-engaged position, the wave spring 54 and plunger 52 automatically ejects the male end form 22 from the bore 32 of the housing 26. Because of the lips 67 of the inside legs 60 and the shelves 66 of the bushing 48, the locker 56 cannot be completely removed from the housing 26.

Obviously, many modifications and variations of the present invention are possible in light of the above teachings and may be practiced otherwise than as specifically described while within the scope of the appended claims.

What is claimed is:

1. A quick connector assembly for mating with a male end form comprising:

a housing having an exterior surface and an inner bore for receiving the male end form;

a locker having a pair of outside legs slidably engaging said exterior surface of said housing and wherein said locker is movable between a non-engaged position for allowing the male end form to be inserted into and withdrawn from said inner bore and an engaged position for trapping said male end form in said inner bore;

at least one of said outside legs of said locker or said exterior surface of said housing including at least two windows and the other of said outside legs of said locker and said housing including at least two notches for engaging said windows and wherein said locker is movable from said engaged position to said non-engaged position only in response to said outside legs being pulled away from one another to disengage said notches from said windows; and a plunger slidably disposed within said inner bore of said housing and a spring engaging said plunger and biasing said plunger in a first direction toward a resting position.

2. The quick connector assembly as set forth in claim 1 wherein each of said legs has a notch and wherein said exterior surface of said housing has a pair of windows.

3. The quick connector assembly as set forth in claim 1 wherein each of said outside legs has a first arc-shaped section having a curvature similar to said exterior surface of said housing and a second arc-shaped section having a curvature similar to said exterior surface of said housing.

4. The quick connector assembly as set forth in claim 3 wherein said notches are disposed on said first arc-shaped sections of said outside legs.

5. The quick connector assembly as set forth in claim 3 wherein said locker is in said engaged position when said first arc-shaped sections of said outside legs engage said exterior surface of said housing.

6. The quick connector assembly as set forth in claim 5 wherein said locker is in said non-engaged position when said second arc-shaped sections of said outside legs engage said exterior surface of said housing.

7. The quick connector assembly as set forth in claim 1 wherein said locker is movable from said non-engaged position to said engaged position only in response to the male end form being inserted into said bore of said housing to slide said plunger away from said resting position.

8. A quick connector assembly for mating with a male end form comprising:

a housing having an exterior surface and an inner bore for receiving the male end form;

a locker having a pair of outside legs slidably engaging said exterior surface of said housing and wherein said locker is movable between a non-engaged position for allowing the male end form to be inserted into and withdrawn from said inner bore and an engaged position for trapping said male end form in said inner bore;

at least one of said outside legs of said locker or said exterior surface of said housing including at least two windows and the other of said outside legs of said locker and said housing including at least two notches for engaging said windows and wherein said locker is movable from said engaged position to said non-engaged position only in response to said outside legs being pulled away from one another to disengage said notches from said windows; and wherein said locker further includes a pair of inside legs.

9. The quick connector assembly as set forth in claim 8 wherein each of said inside legs has an upper section and a different lower section.

10. The quick connector assembly as set forth in claim 9 wherein said upper sections of said inside legs are spaced from one another by a distance that is slightly greater than the diameter of the male end form and wherein said lower sections of said inside legs are spaced from one another by a distance that is slightly greater than the diameter of the bead of the male end form.

11. The quick connector assembly as set forth in claim 8 further including a bushing disposed within said housing.

12. The quick connector assembly as set forth in claim 11 wherein each of said inside legs includes an outwardly extending lip and wherein said bushing includes a pair of shelves for engaging said lips to prevent said locker from being removed from said quick connector assembly.

13. The quick connector assembly as set forth in claim 12 wherein said housing includes a pair of lower gaps through which said inside legs extend when said locker is in said engaged position.

14. A method of removing a male end form from a quick connector assembly having a housing with an exterior surface and a locker with a pair of outside legs and a pair of inside legs, comprising the steps of:

moving at least one of the outer legs outwardly and away from one another separate at least two notches on the exterior surface of the housing or the outside legs from at least two windows on the other of the exterior surface of the housing and the outside legs; and moving the locker from the engaged position to the non-engaged position only after the notches are separated from the windows to disengage the inside legs from the male end form.

\* \* \* \* \*